US010339935B2

(12) United States Patent
Cilingir et al.

(10) Patent No.: US 10,339,935 B2
(45) Date of Patent: Jul. 2, 2019

(54) CONTEXT-AWARE ENROLLMENT FOR TEXT INDEPENDENT SPEAKER RECOGNITION

(71) Applicant: INTEL CORPORATION, Santa Clara, CA (US)

(72) Inventors: Gokcen Cilingir, San Jose, CA (US); Jonathan J. Huang, Pleasanton, CA (US); Narayan Biswal, Folsom, CA (US); Mandar S. Joshi, Saratoga, CA (US)

(73) Assignee: INTEL CORPORATION, Santa Clara, CA (US)

( * ) Notice: Subject to any disclaimer, the term of this patent is extended or adjusted under 35 U.S.C. 154(b) by 8 days.

(21) Appl. No.: 15/626,828

(22) Filed: Jun. 19, 2017

(65) Prior Publication Data
US 2018/0366124 A1   Dec. 20, 2018

(51) Int. Cl.
*G10L 15/20* (2006.01)
*G10L 17/04* (2013.01)
(Continued)

(52) U.S. Cl.
CPC .............. *G10L 17/04* (2013.01); *G10L 15/02* (2013.01); *G10L 17/06* (2013.01); *G10L 17/22* (2013.01);
(Continued)

(58) Field of Classification Search
CPC ......... G10L 15/20; G10L 15/26; G10L 15/00; G10L 17/00
(Continued)

(56) References Cited

U.S. PATENT DOCUMENTS 6,411,930 B1 * 6/2002 Burges .................... G10L 17/04
704/236
9,626,971 B2 * 4/2017 Rodriguez .............. G10L 17/04
(Continued)

OTHER PUBLICATIONS

Wu, Chung-Hsien, and Wei-Bin Liang. "Emotion recognition of affective speech based on multiple classifiers using acoustic-prosodic information and semantic labels." IEEE Transactions on Affective Computing 2.1 (2011): 10-21.*
(Continued)

*Primary Examiner* — Seong-Ah A Shin
(74) *Attorney, Agent, or Firm* — Finch & Maloney PLLC

(57) ABSTRACT

Techniques are provided for training of a text independent (TI) speaker recognition (SR) model. A methodology implementing the techniques according to an embodiment includes measuring context data associated with collected TI speech utterances from a user and identifying the user based on received identity measurements. The method further includes performing a speech quality analysis and a speaker state analysis based on the utterances, and evaluating a training merit value of the utterances, based on the speech quality analysis and the speaker state analysis. If the training merit value exceeds a threshold value, the utterances are stored as training data in a training database. The database is indexed by the user identity and the context data. The method further includes determining whether the stored training data has achieved a sufficiency level for enrollment of a TI SR model, and training the TI SR model for the identified user and context.

24 Claims, 9 Drawing Sheets

(51) Int. Cl.
*G10L 17/22* (2013.01)
*G10L 17/06* (2013.01)
*G10L 15/02* (2006.01)
*G10L 25/60* (2013.01)

(52) U.S. Cl.
CPC ........ *G10L 25/60* (2013.01); *G10L 2015/025* (2013.01)

(58) Field of Classification Search
USPC ........................................ 704/232, 233, 235
See application file for complete search history.

(56) References Cited

U.S. PATENT DOCUMENTS

| | | | |
|---|---|---|---|
| 9,711,148 B1* | 7/2017 | Sharifi | G10L 17/02 |
| 2006/0111905 A1* | 5/2006 | Navratil | G10L 15/144 |
| | | | 704/256.7 |
| 2010/0169090 A1* | 7/2010 | Cui | G10L 15/20 |
| | | | 704/233 |
| 2012/0053935 A1* | 3/2012 | Malegaonkar | G10L 15/07 |
| | | | 704/235 |
| 2012/0109649 A1* | 5/2012 | Talwar | G10L 15/005 |
| | | | 704/236 |
| 2012/0173234 A1* | 7/2012 | Fujimoto | G10L 15/20 |
| | | | 704/233 |
| 2013/0275128 A1* | 10/2013 | Claussen | G10L 15/20 |
| | | | 704/233 |
| 2014/0278412 A1* | 9/2014 | Scheffer | G10L 25/03 |
| | | | 704/240 |
| 2014/0365216 A1* | 12/2014 | Gruber | G10L 13/027 |
| | | | 704/235 |
| 2015/0127350 A1* | 5/2015 | Agiomyrgiannakis | G10L 13/02 |
| | | | 704/266 |
| 2015/0149165 A1* | 5/2015 | Saon | G10L 15/063 |
| | | | 704/232 |
| 2017/0213548 A1* | 7/2017 | Aronowitz | G10L 15/14 |

OTHER PUBLICATIONS

Roy, Nicholas, Joelle Pineau, and Sebastian Thrun. "Spoken dialogue management using probabilistic reasoning." Proceedings of the 38th Annual Meeting on Association for Computational Linguistics. Association for Computational Linguistics, 2000.*

Wu et al., "Emotion recognition of affective speech based on multiple classifiers using acoustic-prosodic information and semantic labels." IEEE Transactions on Affective Computing 2.1 (Year: 2011).*

Roy et al., "Spoken dialogue management using probabilistic reasoning." Proceedings of the 38th Annual Meeting on Association for Computational Linguistics. Association for Computational Linguistics (Year: 2000).*

Hackett, Robert, "Amazon Echo's Alexa Went Dollhouse Crazy", Fortune, Jan. 9, 2017, Retrieved from the Internet: http://fortune.com/2017/01/09/amazon-echo-alexa-dollhouse/, [copy retrieved on Jun. 12, 2017], 1 page.

Scheips, Derek. "Voice Recognition—Benefits and Challenges of This Biometric Application for Access Control", Retrieved from the Internet: https://us.sourcesecurity.com/news/articles/co-3108-ga.4100.html, [copy retrieved on Jun. 12, 2017], 3 pages.

Kinnunen, Tomi, and Haizhou Li. "An overview of text-independent speaker recognition: From features to supervectors." Speech Communication, 2010, 29 pages.

Reynolds, D., et al., "Speaker verification using adapted Gaussian mixture models." Digital signal processing, 2000, vol. 10, 23 pages.

* cited by examiner

CONTEXT-AWARE ENROLLMENT FOR TEXT INDEPENDENT SPEAKER RECOGNITION

BACKGROUND

Some computer systems employ text dependent speaker recognition, wherein a speaker (person) utters a predefined or known phrase, such as "hello computer," for which the system has been trained to recognize the speaker. Text independent speaker recognition, in which the speaker's utterances are unconstrained, presents a more challenging problem. Existing text independent speaker recognition systems generally require a lengthy speaker enrollment procedure that can require five or more minutes of a user's time to generate a model of their voice, which can be burdensome. Additionally, such techniques produce a model that is tailored to the specific context or environment in which the enrollment procedure is carried out and typically do not perform well in other contexts.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts.

Figure 1:
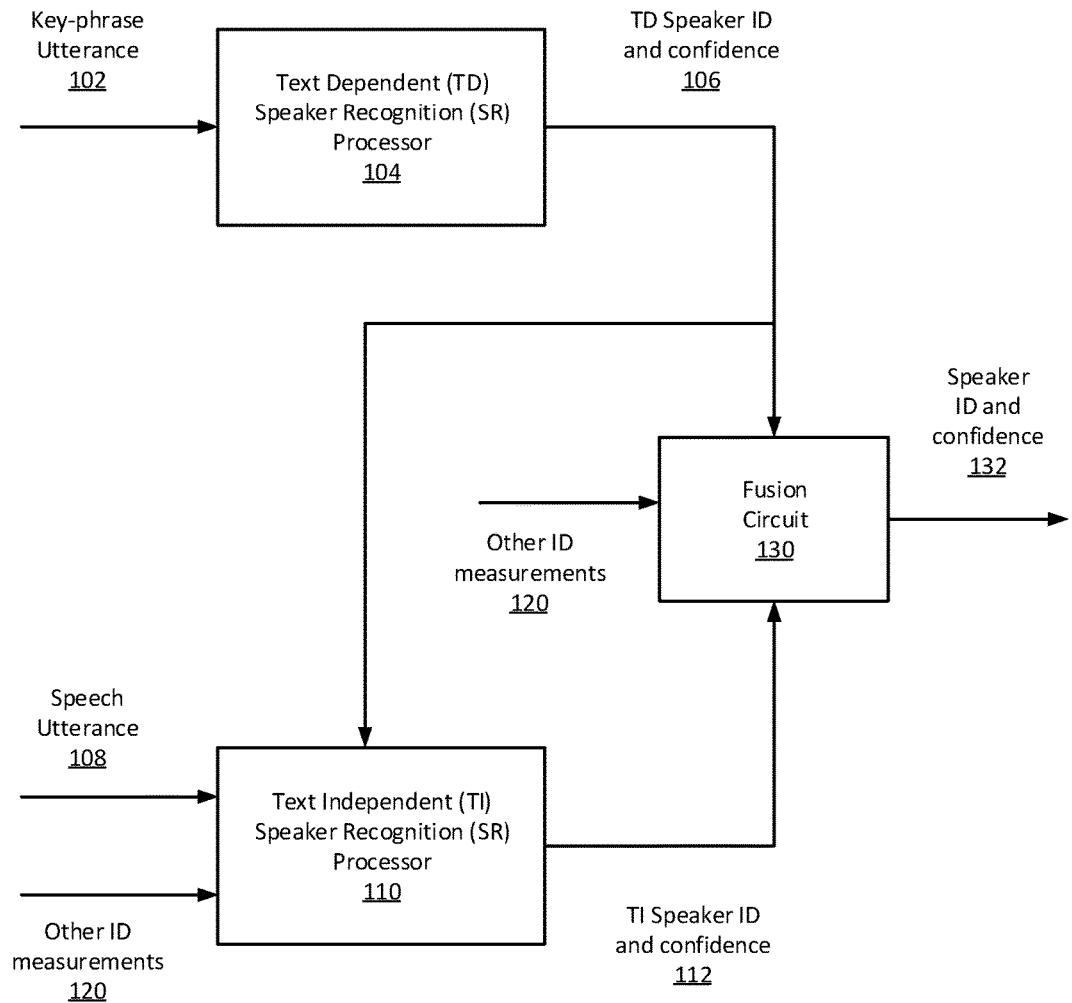
FIG. 1 is a top-level block diagram of a speaker recognition system, configured in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for context-aware training of a text independent (TI) speaker recognition (SR) model. The model is then employed by a speaker recognition system to recognize or identify a speaker based on unconstrained speech (i.e., speech that is not limited to predefined keywords) under varying conditions or contexts. Contexts may include, for example, the locations of the collection of the TI speech utterances, dates and times of the collection, properties of the microphone used for the collection, speech to noise ratio (SNR), noise characteristics, reverberation characteristics, and estimates of the health and emotional state of the user. The techniques provide for model training and adaptation over a relatively extended period of time, for example, as the user issues verbal commands to a speech based application over the course of days, weeks, or months. This approach avoids the requirement for dedicated training time from the user. In some embodiments, the disclosed techniques may be employed in conjunction with text dependent (TD) speaker recognition and other sources of user identification, as will be explained in greater detail below.

The disclosed techniques can be implemented, for example, in a computing system or a software product executable or otherwise controllable by such systems, although other embodiments will be apparent. The system or product is configured to perform context-aware training and adaptation of a text independent (TI) speaker recognition (SR) model as the speaker uses the system over a period of time. In accordance with an embodiment, a methodology to implement these techniques includes measuring context data associated with collected TI speech utterances from the user. The method also includes identifying the user based on one or more identity measurements provided from other sources. The method further includes performing a speech quality analysis and a speaker state analysis based on the utterances, and evaluating a training merit value for those utterances based on the speech quality and speaker state analysis. If the training merit value exceeds a threshold value, the utterances are stored as training data in a training database. The database is indexed by the user identity and the context data. The method further includes determining whether the stored training data has achieved a level of sufficiency such that training may be started. If the sufficiency level has been achieved, a TI SR model is trained for the identified user and associated context.

As will be appreciated, the techniques described herein may allow for improved, TI speaker recognition compared to existing methods that require the user to dedicate an extended period of time for enrollment/training and which do not adequately account for context and environmental factors. The disclosed techniques can be implemented on a broad range of platforms including laptops, tablets, smart phones, workstations, personal assistant systems, and embedded devices. These techniques may further be implemented in hardware or software or a combination thereof.

FIG. 1 is a top-level block diagram of a speaker recognition system 100, configured in accordance with certain embodiments of the present disclosure. The speaker recognition system 100 may be a part of a speech-based application or system such as, for example, a personal assistant. The speaker recognition system 100 is shown to include a text dependent speaker recognition processor 104, a text independent speaker recognition processor 110, and a fusion circuit 130. The TD SR processor 104 is configured to process key-phrase utterances 102 from one or more users and generate a TD speaker ID and associated confidence value 106. Key-phrases are pre-defined utterances such as, for example, "hello computer" or "wake up" which are intended to get the attention of the speech-based application or system. The TI SR processor 110 is configured to process speech utterances 108 from one or more users, along with other provided user ID measurements 120, and generate a TI speaker ID and associated confidence value 112. The speech utterances 108 are generally unconstrained and may include commands such as "what is the weather forecast?" or "find a recipe for chicken soup."

In some embodiments, the key-phrase utterances 102 and the speech utterances 108 may be represented by feature vectors, using known techniques in light of the present disclosure.

The other provided user ID measurements 120 may include, for example, one or more of the results of facial recognition, lip movement detection, skeletal recognition, fingerprint recognition, biometric factor measurement, and the TD speaker ID 106. The operations of the TD SR processor 104 and the TI SR processor 110, will be described in greater detail below. Fusion circuit 130 is configured to generate a speaker ID and confidence value 132 with improved accuracy based on some combination of the TD SR results 106, the TI SR results 112, and the other ID measurements 120, using known techniques in light of the present disclosure.

Figure 2:
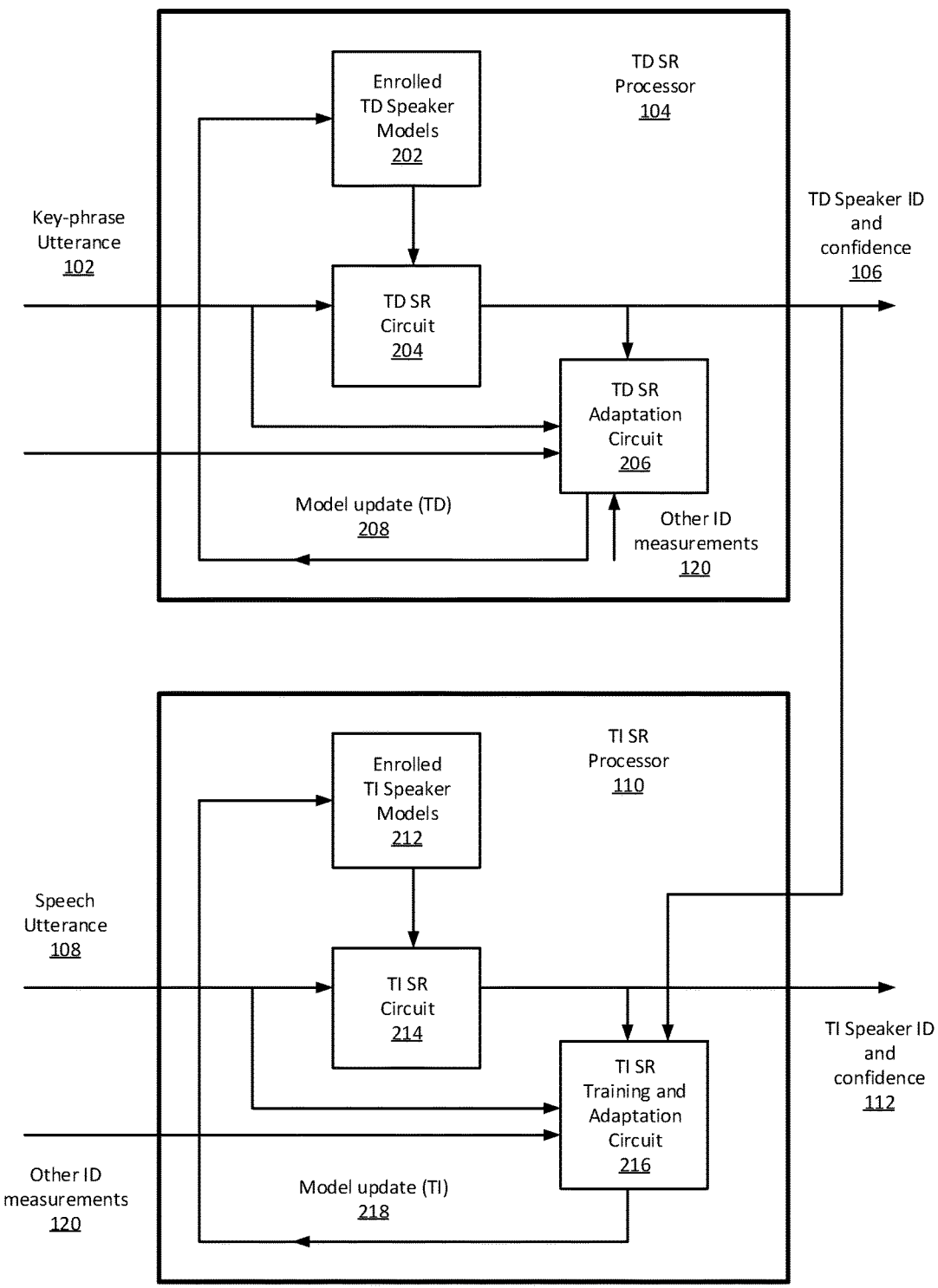
FIG. 2 is a more detailed block diagram of the speaker recognition system, configured in accordance with certain embodiments of the present disclosure.

FIG. 2 is a more detailed block diagram of the speaker recognition system 100, configured in accordance with certain embodiments of the present disclosure. The TD SR processor 104 is shown to include a TD SR circuit 204, a database of enrolled TD speaker models 202, and a TD SR model adaptation circuit 206. The TI SR processor 110 is shown to include a TI SR circuit 214, a database of enrolled TI speaker models 212, and a TI SR model training and adaptation circuit 216. The operations of these components will be described in greater detail below. At a high level, however, the TD SR circuit 204 is configured to provide a TD SR capability as a starting point for the system at deployment. An initial enrolled TD speaker model 202 may be generated through a relatively simple enrollment process such as, for example, repeating the key-phrase three times. The TD SR model adaptation circuit 206 is configured to provide a continuous learning capability for the TD SR system by collecting and cataloging utterances according to context factors to improve the initial enrolled TD speaker model. The TI SR capability for a given speaker is initially disabled when the system is deployed. After sufficient model training data is collected for the speaker, in a given context, the TI SR model training and adaptation circuit 216 generates an enrolled TI speaker model and the TI SR capability is turned on for that speaker in that context. The TI speaker model continues to be adapted and improved over time as more speech is collected and processed.

Figure 3:
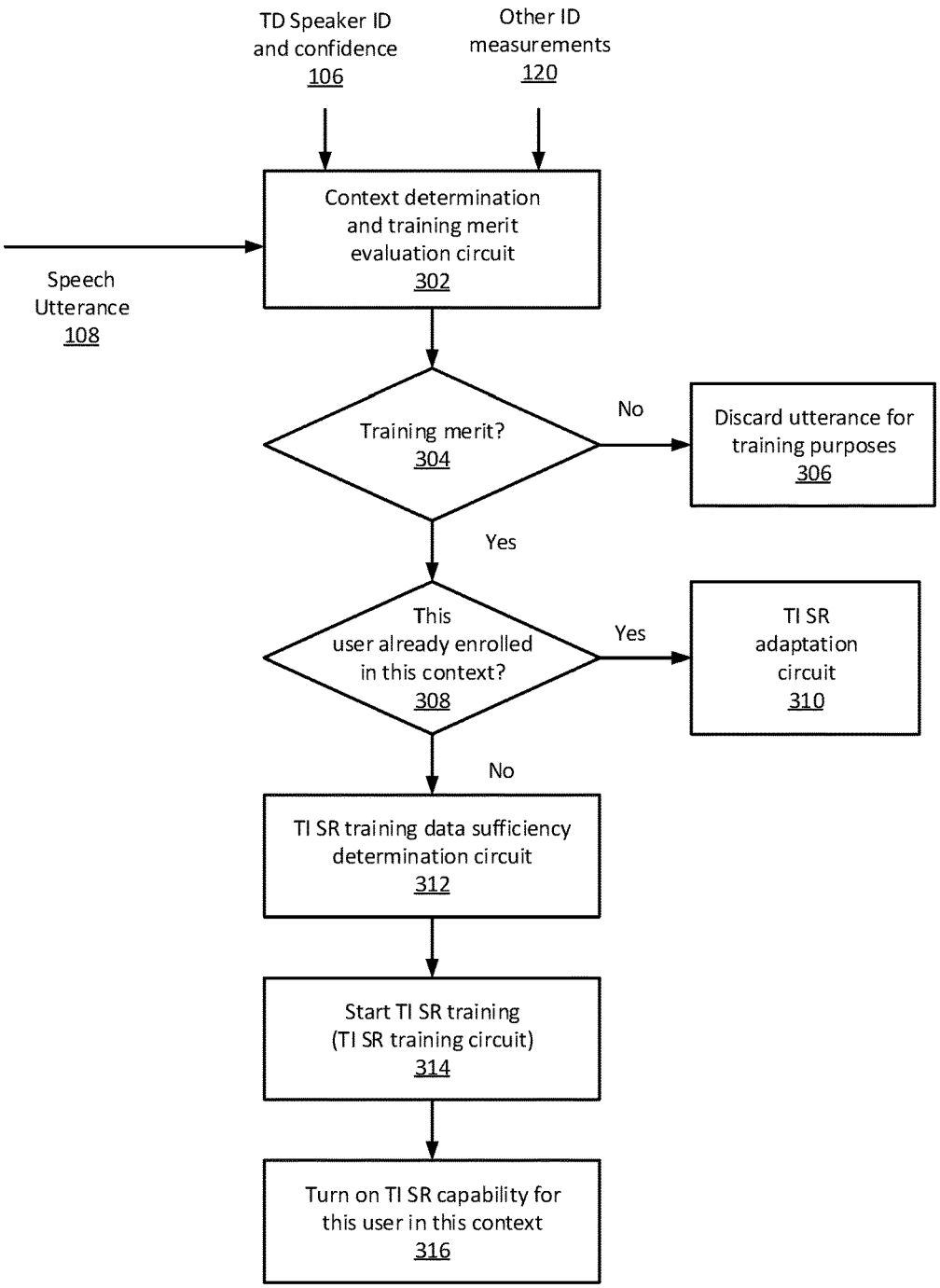
FIG. 3 is a more detailed block diagram of a text independent speaker recognition training and adaptation circuit, configured in accordance with certain embodiments of the present disclosure.

FIG. 3 is a more detailed block diagram of the text independent speaker recognition training and adaptation circuit 216, configured in accordance with certain embodiments of the present disclosure. The TI SR training and adaptation circuit 216 is shown to include a context determination and training merit evaluation circuit 302, a TI SR training data sufficiency determination circuit 312, a TI SR training circuit 314, and a TI SR adaptation circuit 310.

The context determination and training merit evaluation circuit 302 is configured to measure context data associated with collected TI speech utterances from a user in a given context. In some embodiments, the context data may include, for example, a location of the collection of the TI speech utterances, a date of the collection, properties of the microphone used for the collection, SNR, noise characteristics, reverberation characteristics, and health and emotional state of the user. Circuit 302 is also configured to estimate a training merit value associated with the TI speech utterances. The training merit value, which indicates the suitability of the speech utterances for model training purposes, is based on a speech quality analysis and a speaker state analysis, as will be described below. If the training merit value is not acceptable, as tested at operation 304, then the utterance is discarded for training purposes at operation 306. If the user is already enrolled in this context, as tested at operation 308, then control transfers to the TI SR adaptation circuit 310, described below.

The TI SR training data sufficiency determination circuit 312 is configured to evaluate a sufficiency of the stored training data for purposes of enrollment in the TI speaker recognition model. In some embodiments, the sufficiency evaluation is based on a measurement of the variance of phonemes of the collected TI speech utterances and an estimate of the future performance of a TI speaker recognition model that is trained on the stored training data.

The TI SR training circuit 314 is configured to train a TI speaker recognition model, to be associated with the user and the context, based on the stored training data. The TI SR training circuit 314 is further configured to add or enroll the trained TI speaker recognition model to a database of TI speaker recognition models 212, based on the sufficiency of the stored training data, and to enable the TI speaker recognition circuit 214 to recognize the user in the given context based on the added TI speaker recognition model. The database 212 is indexed by the user identity and the context data.

The TI SR adaptation circuit 310 is configured to collect additional TI speech utterances from the user in the context, over subsequent (perhaps extended) periods of time, and evaluate an adaptation merit value for those the additional TI speech utterances. In some embodiments, the adaptation merit value is based on the elapsed time between the initial utterance collections and the subsequent utterance collections, with a bias towards newer (more recently collected) samples. The adaptation merit value may also be based on one or more of the following factors: an estimate of improvement of the TI speaker recognition model due to adaptation based on the additional TI speech utterances; an estimate of the quality of the user identity measurements 120; the increase in phoneme diversity that would result from the additional utterances; and the prediction accuracy of the current model on the new utterances (the lower the accuracy, the greater the difference between the new and old utterances which increases the importance of the new utterances). If the adaptation merit value exceeds a threshold, the TI speaker recognition model is adapted or updated based on the additional TI speech utterances.

Figure 4:
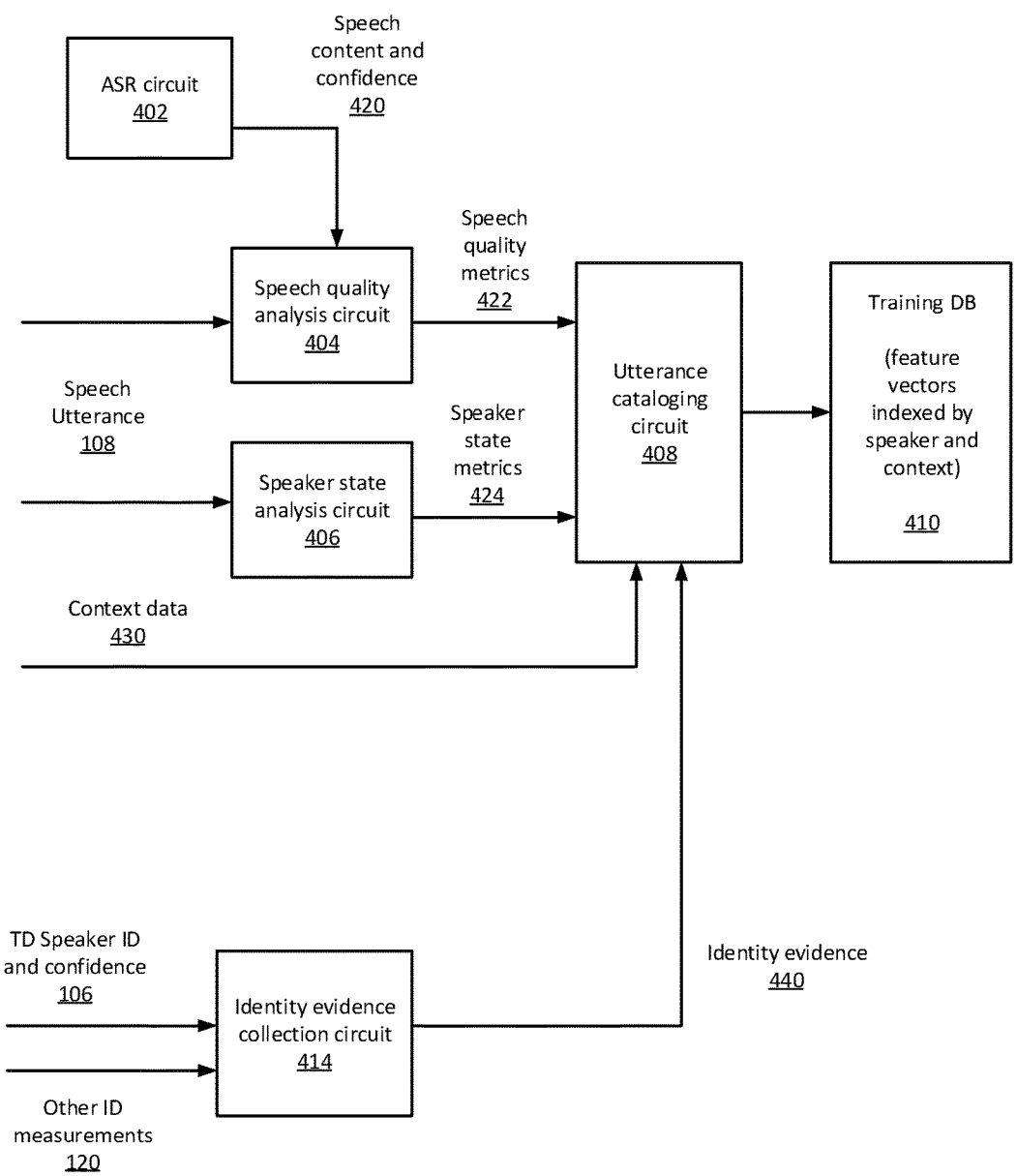
FIG. 4 is a more detailed block diagram of a context determination and training merit evaluation circuit, configured in accordance with certain embodiments of the present disclosure.

FIG. 4 is a more detailed block diagram of the context determination and training merit evaluation circuit 302, configured in accordance with certain embodiments of the present disclosure. The context determination and training merit evaluation circuit 302 is shown to include an automatic speech recognition (ASR) circuit 402, a speech quality analysis circuit 404, a speaker state analysis circuit 406, an utterance cataloging circuit 408, a training database 410, and an identity evidence collection circuit 414.

The ASR circuit 402 is configured to recognize the speech content (e.g., words) of the utterances and provide confidence values for that recognition 420, using known techniques in light of the present disclosure.

The speech quality analysis circuit 404 is configured to perform a speech quality analysis of the TI speech utterances 108 to generate speech quality metrics 422. The speech quality analysis may be based on the ASR confidence 420, the number of frames of the TI speech utterances, measurements of the SNR of the utterances, noise characteristics, and/or reverberation characteristics.

The speaker state analysis circuit 406 is configured to perform a speaker state analysis of the user based on the TI speech utterances 108 to generate speaker state metrics 424. The state analysis may be used to predict the health and emotional state of the user. In some embodiments, the speaker state analysis may employ audio event detection techniques to classify sneezes and coughs to determine that someone in the room may be sick. In that event, the system may be configured to say a phrase such as, for example, "bless you, who just sneezed?" The answer to this question will determine who might be sick, and with this information new enrollment data may be labeled and cataloged for future use. For example, models may be generated based on at least some data collected on sick days. Additionally, a user's personal devices may provide information from which the stress and emotional state of the user can be inferred, for example, physio sensing wearable devices and/or natural language processing sentiment analysis performed on emails and text messages.

The identity evidence collection circuit 414 is configured to identify the user (e.g., generate identity evidence 440) based on identity measurements provided from other sources. The identity measurements may include one or more of a result of text dependent (TD) speaker recognition, facial recognition, lip movement detection, skeletal recognition, fingerprint recognition, and biometric factor measurement.

The training merit value is generated based on some combination of the speech quality metrics 422, the speaker state metrics 424, and the identity evidence 440.

The utterance cataloging circuit 408 is configured to store the TI speech utterances 108 as training data in a training database 410, if the training merit value exceeds a threshold value. The stored utterances are indexed by the user identity and the context data 430.

Figure 5:
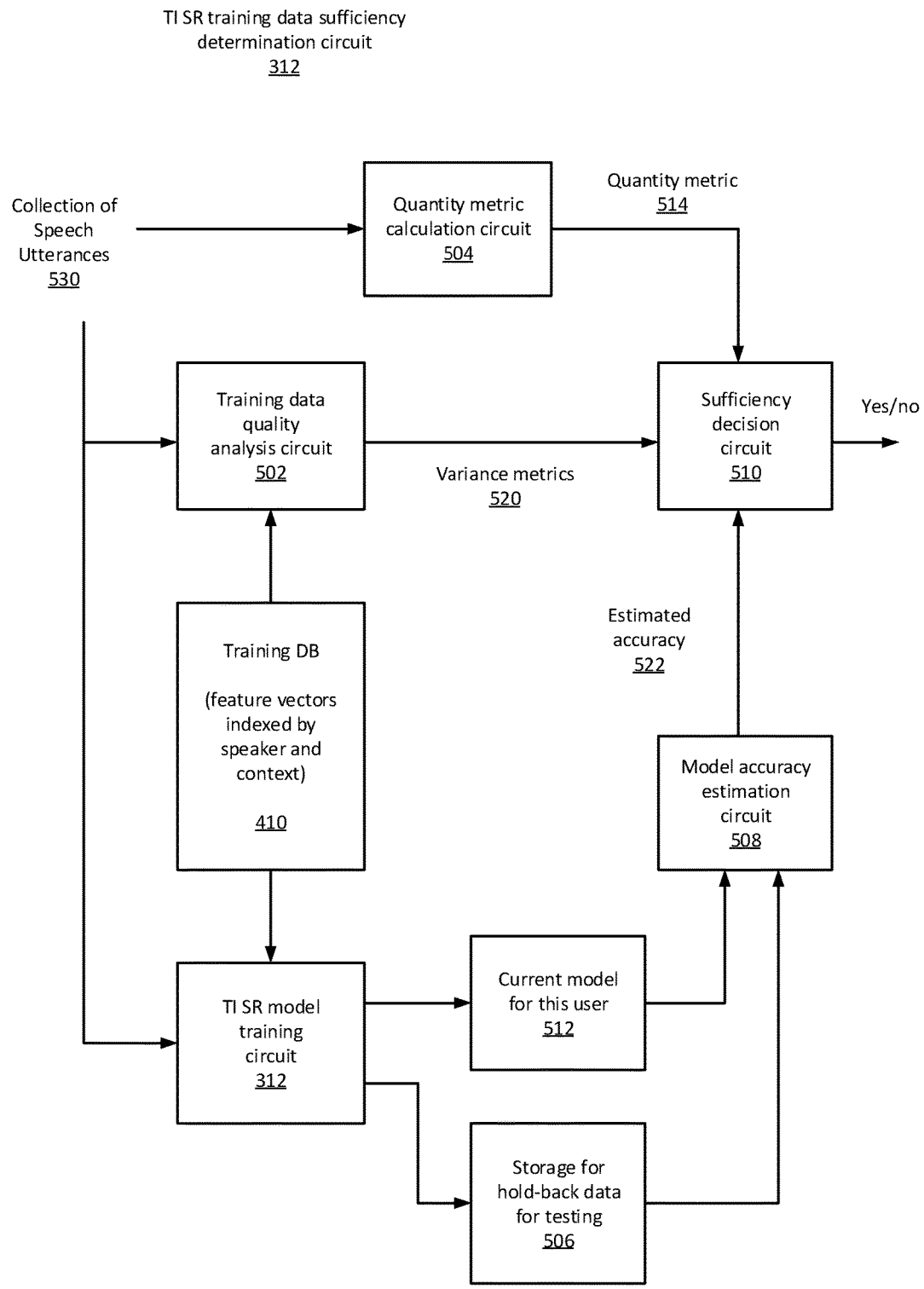
FIG. 5 is a more detailed block diagram of a text independent speaker recognition training data sufficiency determination circuit, configured in accordance with certain embodiments of the present disclosure.

FIG. 5 is a more detailed block diagram of the text independent speaker recognition training data sufficiency determination circuit 312, configured in accordance with certain embodiments of the present disclosure. At a high level, the TI SR training data sufficiency determination circuit 312 is configured to evaluate the sufficiency of the stored training data for training of a speaker model for a speaker in a given context. The training data sufficiency determination circuit 312 is shown to include a training data quality analysis circuit 502, a model training circuit 314, a quantity metric calculation circuit 504, a model accuracy estimation circuit 508, and a sufficiency decision circuit 510.

The training data quality analysis circuit 502 is configured to evaluate the quality of the training data based on phoneme diversity of a collection 530 of the speech utterances 108 and the quantity of training data collected and stored in training database 410. Diversity may be estimated using a variance metric 520 in the feature space where, for example variance is calculated from the distances of each feature vector to a global mean feature vector. Greater variance will be associated with greater diversity. Alternatively, phoneme prediction algorithms and/or speech recognition results may be used to build a phoneme histogram. Each language can be associated with natural phoneme histogram, which shows the natural frequency of phonemes in the spoken language. The similarity of the histogram of an utterance pool to the natural histogram of a language can be quantified using a distance metric. A smaller distance indicates a more naturally diverse utterance collection.

In some embodiments, the sufficiency criteria may be based on an additional quantity metric 514. Quantity metric calculation circuit 504 is configured to analyze the collection of speech utterances 530 to determine the total speech content of the collection. In some embodiments, a voice activity detection (VAD) technique may be employed to exclude pauses or other gaps in the utterances prior to measuring the total speech content.

In some embodiments, the sufficiency criteria may be based on yet another metric, the expected accuracy 522 of a model 512 that is trained (e.g., by model training circuit 314) on the current utterance collection 530. If the expected accuracy, as estimated by circuit 508, is high enough, then sufficient data has been collected to build the speaker model. This metric is used in combination with the diversity metric since it is possible for an expected accuracy to be high in a non-diverse utterance collection. For the expected accuracy estimation, some data may be held back 506 on both the targeted user as well as other users (intruders or false alarms) for testing. If intruder data is not available for collection, the system may supply a relatively small prepared collection of intruder utterances to facilitate the accurate estimation of the expected accuracy. The sufficiency decision circuit 510 is configured to provide a sufficiency decision based on the variance metrics 520 and the estimated model accuracy 522.

Figure 6:
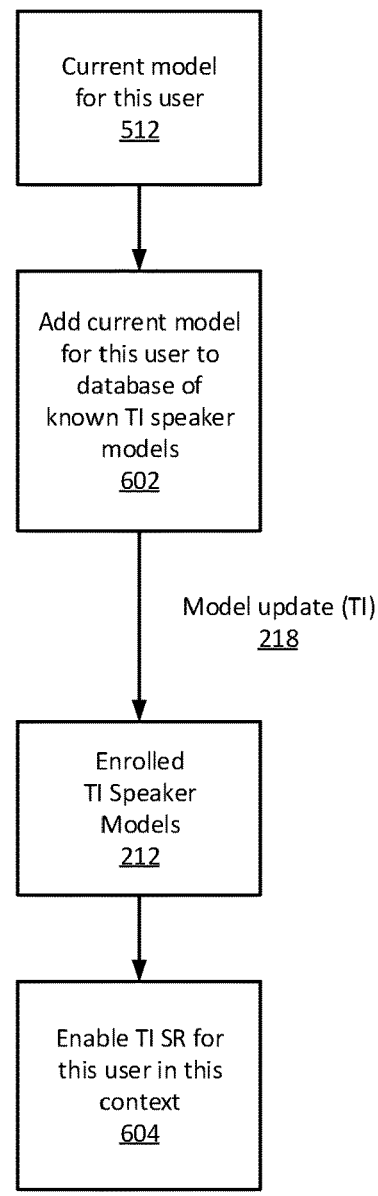
FIG. 6 is a flowchart illustrating a methodology for enabling text independent speaker recognition for a user in a context, in accordance with certain embodiments of the present disclosure.

FIG. 6 is a flowchart illustrating a methodology for enabling text independent speaker recognition for a user in a context 316, in accordance with certain embodiments of the present disclosure. At operation 602, the current model for this user 512 is added to the database of known TI speaker models 212, to accomplish the TI model update 218. At operation 604, TI speaker recognition is enabled for this user in this context. During a verification phase, context matching may or may not be enforced, particularly during the initial stages when the system has not yet gathered enough training data in a sufficient number of different contexts. Policies on what is considered a context match may be defined and refined over time as the system is deployed.

Figure 7:
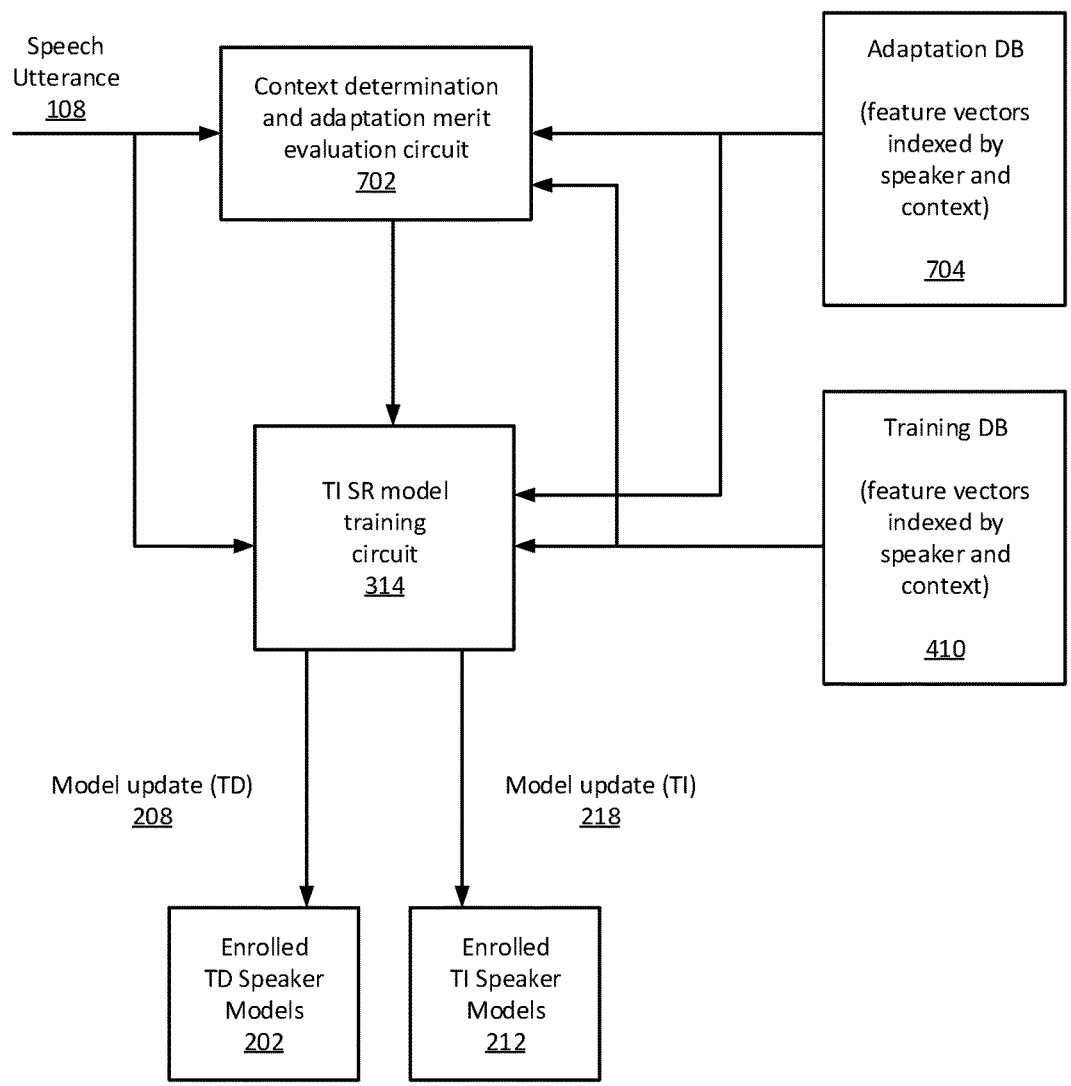
FIG. 7 is a more detailed block diagram of a speaker recognition adaptation circuit, configured in accordance with certain embodiments of the present disclosure.

FIG. 7 is a more detailed block diagram of the speaker recognition adaptation circuit 206 and 310, configured in accordance with certain embodiments of the present disclosure. The speaker recognition adaptation circuits for TD 206 and for TI 310 are shown to include a context determination and adaptation merit evaluation circuit 702, model training (re-training) circuit 314, adaptation database 704, training database 410, database of enrolled TD speaker models 202, and database of enrolled TI speaker models 212.

At a high level, speaker model adaptation provides techniques for continuous learning after deployment of the system. TD speaker models 202 and TI speaker models 212 can be refined either by re-training (e.g., by circuit 314) with an altered set of enrollment utterances or the training algorithm may be defined as an iterative process in which additional feature vectors may be fed to the existing model without the need for re-training. If the speaker is already enrolled in the given context, a captured utterance from the speaker in the same context can be used for adapting the model (e.g., TD model update 208 and/or TI model update 218).

Collected utterances (or the associated feature vectors) that can be used for adaptation are organized by speaker and context in an adaptation database 704. In some embodiments, for TI SR, the adaptation database 704 may be combined with training database 410.

The context determination and adaptation merit evaluation circuit 702 is configured in a manner similar to context determination and training merit evaluation circuit 302, to estimate an adaptation merit value associated with the TI speech utterances. The adaptation merit value, which indicates the suitability of the speech utterances for adaptation purposes, is based on evaluation of metrics as previously described (e.g., elapsed time between old and new utterances, estimation of model improvement, estimation of quality of the user identity measurements, increase in phoneme diversity, and prediction accuracy of the current model on the new utterances). In some embodiments, circuit 702 may quantify the above factors using threshold values and decision policies that can differ from the threshold values used by circuit 302.

In some embodiments, adaptation may be initiated when some combination (e.g., a sum) of the top scoring metrics exceeds a threshold value.

Methodology

Figure 8:
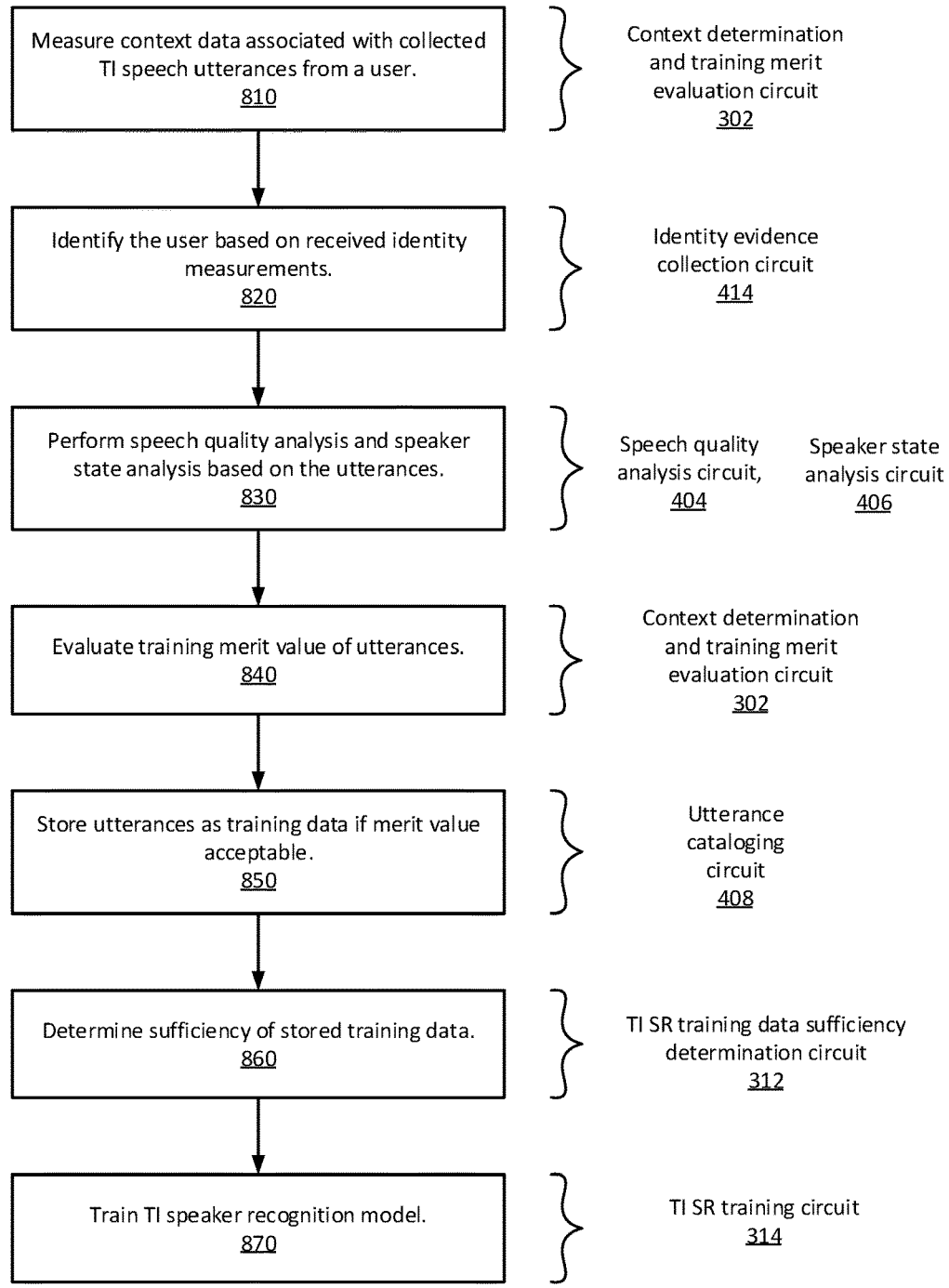
FIG. 8 is a flowchart illustrating a methodology for training a text independent speaker recognition model, in accordance with certain embodiments of the present disclosure.

FIG. 8 is a flowchart illustrating an example method 800 for training a text independent speaker recognition model, in accordance with certain embodiments of the present disclosure. As can be seen, the example method includes a number of phases and sub-processes, the sequence of which may vary from one embodiment to another. However, when considered in the aggregate, these phases and sub-processes form a process for a text independent speaker recognition model training in accordance with certain of the embodiments disclosed herein. These embodiments can be implemented, for example using the system architecture illustrated in FIGS. 1-7 as described above. However other system architectures can be used in other embodiments, as will be apparent in light of this disclosure. To this end, the correlation of the various functions shown in FIG. 8 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module having decoupled sub-modules can be used to perform all of the functions of method 800. Thus, other embodiments may have fewer or more modules and/or sub-modules depending on the granularity of implementation. In still other embodiments, the methodology depicted can be implemented as a computer program product including one or more non-transitory machine readable mediums that when executed by one or more processors cause the methodology to be carried out. Numerous variations and alternative configurations will be apparent in light of this disclosure.

As illustrated in FIG. 8, in an embodiment, method 800 for TI speaker recognition model training commences by measuring, at operation 810, context data associated with collected TI speech utterances from a user in a context. In some embodiments, the context data may include the location of the collection of the TI speech utterances, a date of the collection, properties of a microphone used for the collection, SNR, noise characteristics, reverberation characteristics, and/or the health and emotional state of the user. The TI speech utterances may be collected over an extended period of time, for example days, weeks, or months, as the user employs the system.

Next, at operation 820, the user is identified based on received identity measurements. In some embodiments, the identity measurements may include one or more of the results of text dependent (TD) speaker recognition, facial recognition, lip movement detection, skeletal recognition, fingerprint recognition, and biometric factor measurement.

At operation 830, a speech quality analysis and a speaker state analysis are performed on the TI speech utterances. At operation 840, a training merit value, associated with the TI speech utterances, is evaluated. The evaluation is based on the speech quality analysis and the speaker state analysis.

At operation 850, the TI speech utterances are stored as training data in a training database, if the training merit value exceeds a threshold value. The stored utterances indexed by the user identity and the context data.

At operation 860, a sufficiency determination is made for the stored training data to be used for training of a TI speaker recognition model. In some embodiments, the sufficiency determination may be based, at least in part, on the variance of phonemes of the collected utterances, an estimate of the future performance of a TI speaker recognition model is trained on the stored training data, and on speech content duration of the collected utterances (e.g., a measure of quantity of training data).

At operation 870, a TI speaker recognition model is trained. The model is associated with the user and the context, based on the stored training data. The trained model is added to a database of TI speaker recognition models that are indexed by the user identity and the context data. A TI speaker recognizer is then enabled for the user in that context, based on the added TI speaker recognition model.

Of course, in some embodiments, additional operations may be performed, as previously described in connection with the system. For example, additional TI speech utterances may be collected from the user in the context over a future period of time, and the recognition model may be adapted based on those additional utterances. In some embodiments, the speech utterances may be represented as feature vectors.

Example System

Figure 9:
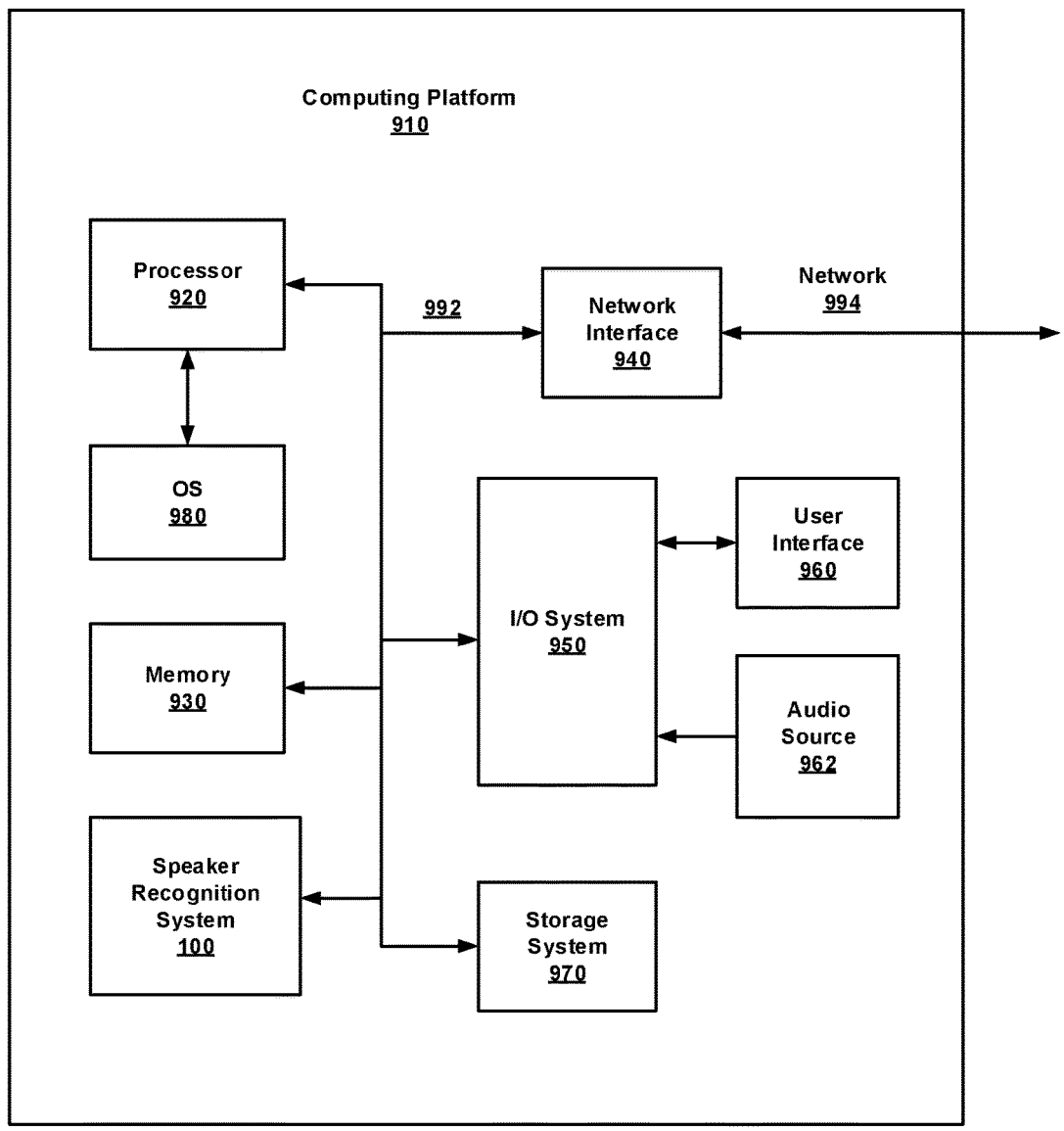
FIG. 9 is a block diagram schematically illustrating a computing platform configured to perform text independent speaker recognition, in accordance with certain embodiments of the present disclosure.

FIG. 9 illustrates an example system 900 to perform text independent speaker recognition, configured in accordance with certain embodiments of the present disclosure. In some embodiments, system 900 comprises a computing platform 910 which may host, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, imaging device, and so forth. Any combination of different devices may be used in certain embodiments.

In some embodiments, platform 910 may comprise any combination of a processor 920, a memory 930, speaker recognition system 100, a network interface 940, an input/output (I/O) system 950, a user interface 960, an audio source 962, and a storage system 970. As can be further seen, a bus and/or interconnect 992 is also provided to allow for communication between the various components listed above and/or other components not shown. Platform 910 can be coupled to a network 994 through network interface 940 to allow for communications with other computing devices, platforms, or resources. Other componentry and functionality not reflected in the block diagram of FIG. 9 will be apparent in light of this disclosure, and it will be appreciated that other embodiments are not limited to any particular hardware configuration.

Processor 920 can be any suitable processor, and may include one or more coprocessors or controllers, such as an audio processor, a graphics processing unit, or hardware accelerator, to assist in control and processing operations associated with system 900. In some embodiments, the processor 920 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 920 may be implemented as a complex instruction set computer (CISC) or a reduced instruction set computer (RISC) processor. In some embodiments, processor 920 may be configured as an x86 instruction set compatible processor.

Memory 930 can be implemented using any suitable type of digital storage including, for example, flash memory and/or random access memory (RAM). In some embodiments, the memory 930 may include various layers of memory hierarchy and/or memory caches as are known to those of skill in the art. Memory 930 may be implemented as a volatile memory device such as, but not limited to, a RAM, dynamic RAM (DRAM), or static RAM (SRAM) device. Storage system 970 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 970 may comprise technology to increase the storage performance enhanced protection for valuable digital media when multiple hard drives are included.

Processor 920 may be configured to execute an Operating System (OS) 980 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with system 900, and therefore may also be implemented using any suitable existing or subsequently-developed platform.

Network interface circuit 940 can be any appropriate network chip or chipset which allows for wired and/or wireless connection between other components of computer system 900 and/or network 994, thereby enabling system 900 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 950 may be configured to interface between various I/O devices and other components of computer system 900. I/O devices may include, but not be limited to, user interface 960 and audio source 962 (e.g., a microphone or other suitable source). User interface 960 may include devices (not shown) such as a display element, touchpad, keyboard, mouse, and speaker, etc. I/O system 950 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 920 or any chipset of platform 910.

It will be appreciated that in some embodiments, the various components of the system 900 may be combined or integrated in a system-on-a-chip (SoC) architecture. In some embodiments, the components may be hardware components, firmware components, software components or any suitable combination of hardware, firmware or software.

Speaker recognition system 100 is configured to perform text independent speaker recognition using a recognizer that employs trained text independent speaker recognition models, as described previously. Speaker recognition system 100 may include any or all of the circuits/components illustrated in FIGS. 1-7, as described above. These components can be implemented or otherwise used in conjunction with a variety of suitable software and/or hardware that is coupled to or that otherwise forms a part of platform 910. These components can additionally or alternatively be implemented or otherwise used in conjunction with user I/O devices that are capable of providing information to, and receiving information and commands from, a user.

In some embodiments, these circuits may be installed local to system 900, as shown in the example embodiment of FIG. 9. Alternatively, system 900 can be implemented in a client-server arrangement wherein at least some functionality associated with these circuits is provided to system 900 using an applet, such as a JavaScript applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 994 or remotely coupled to network 994 by one or more other networks and/or communication channels. In some cases, access to resources on a given network or computing system may require credentials such as usernames, passwords, and/or compliance with any other suitable security mechanism.

In various embodiments, system 900 may be implemented as a wireless system, a wired system, or a combination of both. When implemented as a wireless system, system 900 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 900 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the speaker recognition methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 994. In other embodiments, the functionalities disclosed herein can be incorporated into other software applications, such as, for example, personal assistants, robotics, gaming, and security applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments system 900 may comprise additional, fewer, or alternative subcomponents as compared to those included in the example embodiment of FIG. 9.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a processor-implemented method for training of a text independent (TI) speaker recognition model, The method comprises: measuring, by a processor-based system, context data associated with collected TI speech utterances from a user in a context, the collected TI speech collected during a first time interval; identifying, by the processor-based system, an identity of the user based on received identity measurements; performing, by the processor-based system, a speech quality analysis of the TI speech utterances; performing, by the processor-based system, a state analysis of the user based on the TI speech utterances; evaluating, by the processor-based system, a training merit value associated with the TI speech utterances, based on the speech quality analysis and the state analysis; and storing, by the processor-based system, the TI speech utterances as training data in a training database, if the training merit value exceeds a threshold value, the stored utterances indexed by the user identity and the context data.

Example 2 includes the subject matter of Example 1, further comprising: determining a sufficiency of the stored training data for enrollment of a TI speaker recognition model; and training the TI speaker recognition model, associated with the user and the context, based on the stored training data.

Example 3 includes the subject matter of Examples 1 or 2, wherein the enrollment further comprises: adding the trained TI speaker recognition model to a database of TI speaker recognition models, based on the sufficiency of the stored training data, the database indexed by the user identity and the context data; and enabling a TI speaker recognizer for the user in the context based on the added TI speaker recognition model.

Example 4 includes the subject matter of any of Examples 1-3, further comprising: collecting additional TI speech utterances from the user in the context, during a second time interval; evaluating an adaptation merit value associated with the additional TI speech utterances, the adaptation merit value based on at least one of the elapsed time between the first time interval and the second time interval, and an estimate of improvement of the TI speaker recognition model due to adaptation based on the additional TI speech utterances; and adapting the TI speaker recognition model based on the additional TI speech utterances, if the adaptation merit value exceeds a threshold.

Example 5 includes the subject matter of any of Examples 1-4, wherein the determination of sufficiency further comprises: measuring variance of phonemes of the collected TI speech utterances; and estimating future performance of a TI speaker recognition model trained on the stored training data.

Example 6 includes the subject matter of any of Examples 1-5, wherein the identity measurements comprise at least one of a result of text dependent (TD) speaker recognition, facial recognition, lip movement detection, skeletal recognition, fingerprint recognition, and biometric factor measurement.

Example 7 includes the subject matter of any of Examples 1-6, wherein the speech quality analysis comprises measuring at least one of a number of frames of the TI speech utterances, a speech to noise ratio (SNR) of the TI speech utterances, noise characteristics of the TI speech utterances, and reverberation characteristics of the TI speech utterances; and the state analysis comprises predicting health and emotional state of the user.

Example 8 includes the subject matter of any of Examples 1-7, wherein the context data includes at least one of a location of the collected TI speech utterances, a date of the collection, properties of a microphone used for the collection, SNR, noise characteristics, reverberation characteristics, and health and emotional state of the user.

Example 9 includes the subject matter of any of Examples 1-8, wherein the speech utterances are represented as feature vectors.

Example 10 is a system for training of a text independent (TI) speaker recognition model. The system comprises: a context determination circuit to measure context data associated with collected TI speech utterances from a user in a context, the collected TI speech collected during a first time interval; an identity evidence collection circuit to identify the user based on received identity measurements; a speech quality analysis circuit to perform a speech quality analysis of the TI speech utterances; a speaker state analysis circuit to perform a state analysis of the user based on the TI speech utterances; a training merit evaluation circuit to estimate a training merit value associated with the TI speech utterances, based on the speech quality analysis and the state analysis; an utterance cataloging circuit to store the TI speech utterances as training data in a training database, if the training merit value exceeds a threshold value, the stored utterances indexed by the user identity and the context data; a training data sufficiency determination circuit to evaluate a sufficiency of the stored training data for enrollment of a TI speaker recognition model; a TI speaker recognition training circuit to train the TI speaker recognition model, associated with the user and the context, based on the stored training data.

Example 11 includes the subject matter of Example 10, wherein the TI speaker recognition training circuit is further to add the trained TI speaker recognition model to a database of TI speaker recognition models, based on the sufficiency of the stored training data, the database indexed by the user identity and the context data; and to enable a TI speaker recognition circuit to recognize the user in the context based on the added TI speaker recognition model.

Example 12 includes the subject matter of Examples 10 or 11, further comprising a TI speaker recognition adaptation circuit to: collect additional TI speech utterances from the user in the context, during a second time interval; evaluate an adaptation merit value associated with the additional TI speech utterances, the adaptation merit value based on at least one of the elapsed time between the first time interval and the second time interval, and an estimate of improvement of the TI speaker recognition model due to adaptation based on the additional TI speech utterances; and adapt the TI speaker recognition model based on the additional TI speech utterances, if the adaptation merit value exceeds a threshold.

Example 13 includes the subject matter of any of Examples 10-12, wherein the training data sufficiency determination circuit is further to: measure variance of phonemes of the collected TI speech utterances; and estimate future performance of a TI speaker recognition model trained on the stored training data.

Example 14 includes the subject matter of any of Examples 10-13, wherein the identity measurements comprise at least one of a result of text dependent (TD) speaker recognition, facial recognition, lip movement detection, skeletal recognition, fingerprint recognition, and biometric factor measurement.

Example 15 includes the subject matter of any of Examples 10-14, wherein the speech quality analysis circuit is further to measure at least one of a number of frames of the TI speech utterances, a speech to noise ratio (SNR) of the TI speech utterances, noise characteristics of the TI speech utterances, and reverberation characteristics of the TI speech utterances; and the state analysis circuit is further to predict health and emotional state of the user.

Example 16 includes the subject matter of any of Examples 10-15, wherein the context data includes at least one of a location of the collected TI speech utterances, a date of the collection, properties of a microphone used for the collection, SNR, noise characteristics, reverberation characteristics, and health and emotional state of the user.

Example 17 includes the subject matter of any of Examples 10-16, wherein the speech utterances are represented as feature vectors.

Example 18 is at least one non-transitory computer readable storage medium having instructions encoded thereon that, when executed by one or more processors, result in the following operations for training of a text independent (TI) speaker recognition model. The operations comprise: measuring context data associated with collected TI speech utterances from a user in a context, the collected TI speech collected during a first time interval; identifying an identity of the user based on received identity measurements; performing a speech quality analysis of the TI speech utterances; performing a state analysis of the user based on the TI speech utterances; evaluating a training merit value associated with the TI speech utterances, based on the speech quality analysis and the state analysis; storing the TI speech utterances as training data in a training database, if the training merit value exceeds a threshold value, the stored utterances indexed by the user identity and the context data; determining a sufficiency of the stored training data for enrollment of a TI speaker recognition model; and training the TI speaker recognition model, associated with the user and the context, based on the stored training data.

Example 19 includes the subject matter of Example 18, wherein the enrollment further comprises the operations of: adding the trained TI speaker recognition model to a database of TI speaker recognition models, based on the sufficiency of the stored training data, the database indexed by the user identity and the context data; and enabling a TI speaker recognizer for the user in the context based on the added TI speaker recognition model.

Example 20 includes the subject matter of Examples 18 or 19, the operations further comprising: collecting additional TI speech utterances from the user in the context, during a second time interval; evaluating an adaptation merit value associated with the additional TI speech utterances, the adaptation merit value based on at least one of the elapsed time between the first time interval and the second time interval, and an estimate of improvement of the TI speaker recognition model due to adaptation based on the additional TI speech utterances; and adapting the TI speaker recognition model based on the additional TI speech utterances, if the adaptation merit value exceeds a threshold.

Example 21 includes the subject matter of any of Examples 18-20, wherein the determination of sufficiency further comprises the operations of: measuring variance of phonemes of the collected TI speech utterances; and estimating future performance of a TI speaker recognition model trained on the stored training data.

Example 22 includes the subject matter of any of Examples 18-21, wherein the identity measurements comprise at least one of a result of text dependent (TD) speaker recognition, facial recognition, lip movement detection, skeletal recognition, fingerprint recognition, and biometric factor measurement.

Example 23 includes the subject matter of any of Examples 18-22, wherein the speech quality analysis comprises the operations of measuring at least one of a number of frames of the TI speech utterances, a speech to noise ratio (SNR) of the TI speech utterances, noise characteristics of the TI speech utterances, and reverberation characteristics of the TI speech utterances; and the state analysis comprises the operations of predicting health and emotional state of the user.

Example 24 includes the subject matter of any of Examples 18-23, wherein the context data includes at least one of a location of the collected TI speech utterances, a date of the collection, properties of a microphone used for the collection, SNR, noise characteristics, reverberation characteristics, and health and emotional state of the user.

Example 25 includes the subject matter of any of Examples 18-24, wherein the speech utterances are represented as feature vectors.

Example 26 is a system for training of a text independent (TI) speaker recognition model. The system comprises: means for measuring context data associated with collected TI speech utterances from a user in a context, the collected TI speech collected during a first time interval; means for identifying an identity of the user based on received identity measurements; means for performing a speech quality analysis of the TI speech utterances; means for performing a state analysis of the user based on the TI speech utterances; means for evaluating a training merit value associated with the TI speech utterances, based on the speech quality analysis and the state analysis; and means for storing the TI speech utterances as training data in a training database, if the training merit value exceeds a threshold value, the stored utterances indexed by the user identity and the context data.

Example 27 includes the subject matter of Example 26, further comprising: means for determining a sufficiency of the stored training data for enrollment of a TI speaker recognition model; and means for training the TI speaker recognition model, associated with the user and the context, based on the stored training data.

Example 28 includes the subject matter of Examples 26 or 27, wherein the enrollment further comprises: means for adding the trained TI speaker recognition model to a database of TI speaker recognition models, based on the sufficiency of the stored training data, the database indexed by the user identity and the context data; and means for enabling a TI speaker recognizer for the user in the context based on the added TI speaker recognition model.

Example 29 includes the subject matter of any of Examples 26-28, further comprising: means for collecting additional TI speech utterances from the user in the context, during a second time interval; means for evaluating an adaptation merit value associated with the additional TI speech utterances, the adaptation merit value based on at least one of the elapsed time between the first time interval and the second time interval, and an estimate of improvement of the TI speaker recognition model due to adaptation based on the additional TI speech utterances; and means for adapting the TI speaker recognition model based on the additional TI speech utterances, if the adaptation merit value exceeds a threshold.

Example 30 includes the subject matter of any of Examples 26-29, wherein the determination of sufficiency further comprises: means for measuring variance of phonemes of the collected TI speech utterances; and means for estimating future performance of a TI speaker recognition model trained on the stored training data.

Example 31 includes the subject matter of any of Examples 26-30, wherein the identity measurements comprise at least one of a result of text dependent (TD) speaker recognition, facial recognition, lip movement detection, skeletal recognition, fingerprint recognition, and biometric factor measurement.

Example 32 includes the subject matter of any of Examples 26-31, wherein the speech quality analysis comprises means for measuring at least one of a number of frames of the TI speech utterances, a speech to noise ratio (SNR) of the TI speech utterances, noise characteristics of the TI speech utterances, and reverberation characteristics of the TI speech utterances; and the state analysis comprises means for predicting health and emotional state of the user.

Example 33 includes the subject matter of any of Examples 26-32, wherein the context data includes at least one of a location of the collected TI speech utterances, a date of the collection, properties of a microphone used for the collection, SNR, noise characteristics, reverberation characteristics, and health and emotional state of the user.

Example 34 includes the subject matter of any of Examples 26-33, wherein the speech utterances are represented as feature vectors.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for recognizing a speaker, the method comprising:
    measuring, by a processor-based system, context data associated with collected TI speech utterances from a user in a context, the collected TI speech collected during a first time interval;
    identifying, by the processor-based system, an identity of the user based on received identity measurements;
    performing, by the processor-based system, a speech quality analysis of the TI speech utterances;
    performing, by the processor-based system, a state analysis of the user based on the TI speech utterances;
    evaluating, by the processor-based system, a training merit value associated with the TI speech utterances, based on the speech quality analysis and the state analysis;
    storing, by the processor-based system, the TI speech utterances as training data in a training database, if the training merit value exceeds a threshold value, the stored utterances indexed by the user identity and the context data;
    determining a sufficiency of the stored training data for enrollment of a TI speaker recognition model;
    training the TI speaker recognition model, associated with the user and the context, based on the stored training data; and
    employing the TI speaker recognition model to recognize the user.

2. The method of claim 1, wherein the enrollment further comprises:
adding the trained TI speaker recognition model to a database of TI speaker recognition models, based on the sufficiency of the stored training data, the database indexed by the user identity and the context data; and
enabling a TI speaker recognizer for the user in the context based on the added TI speaker recognition model.

3. The method of claim 1, further comprising:
collecting additional TI speech utterances from the user in the context, during a second time interval;
evaluating an adaptation merit value associated with the additional TI speech utterances, the adaptation merit value based on at least one of the elapsed time between the first time interval and the second time interval, and an estimate of improvement of the TI speaker recognition model due to adaptation based on the additional TI speech utterances; and
adapting the TI speaker recognition model based on the additional TI speech utterances, if the adaptation merit value exceeds a threshold.

4. The method of claim 1, wherein the determination of sufficiency further comprises:
measuring variance of phonemes of the collected TI speech utterances; and
estimating future performance of a TI speaker recognition model trained on the stored training data.

5. The method of claim 1, wherein the identity measurements comprise at least one of a result of text dependent (TD) speaker recognition, facial recognition, lip movement detection, skeletal recognition, fingerprint recognition, and biometric factor measurement.

6. The method of claim 1, wherein the speech quality analysis comprises measuring at least one of a number of frames of the TI speech utterances, a speech to noise ratio (SNR) of the TI speech utterances, noise characteristics of the TI speech utterances, and reverberation characteristics of the TI speech utterances; and the state analysis comprises predicting health and emotional state of the user.

7. The method of claim 1, wherein the context data includes at least one of a location of the collected TI speech utterances, a date of the collection, properties of a microphone used for the collection, SNR, noise characteristics, reverberation characteristics, and health and emotional state of the user.

8. The method of claim 1, wherein the speech utterances are represented as feature vectors.

9. A system for recognizing a speaker, the system comprising:
a context determination circuit configured to measure context data associated with collected TI speech utterances from a user in a context, the collected TI speech collected during a first time interval;
an identity evidence collection circuit configured to identify the user based on received identity measurements;
a speech quality analysis circuit configured to perform a speech quality analysis of the TI speech utterances;
a speaker state analysis circuit configured to perform a state analysis of the user based on the TI speech utterances;
a training merit evaluation circuit configured to estimate a training merit value associated with the TI speech utterances, based on the speech quality analysis and the state analysis;
an utterance cataloging circuit configured to store the TI speech utterances as training data in a training database, if the training merit value exceeds a threshold value, the stored utterances indexed by the user identity and the context data;
a training data sufficiency determination circuit configured to evaluate a sufficiency of the stored training data for enrollment of a TI speaker recognition model; and
a TI speaker recognition training circuit configured to train the TI speaker recognition model, associated with the user and the context, based on the stored training data,
wherein the system is configured to employ the TI speaker recognition model to recognize the user.

10. The system of claim 9, wherein the TI speaker recognition training circuit is further configured to add the trained TI speaker recognition model to a database of TI speaker recognition models, based on the sufficiency of the stored training data, the database indexed by the user identity and the context data; and to enable a TI speaker recognition circuit to recognize the user in the context based on the added TI speaker recognition model.

11. The system of claim 9, further comprising a TI speaker recognition adaptation circuit configured to:
collect additional TI speech utterances from the user in the context, during a second time interval;
evaluate an adaptation merit value associated with the additional TI speech utterances, the adaptation merit value based on at least one of the elapsed time between the first time interval and the second time interval, and an estimate of improvement of the TI speaker recognition model due to adaptation based on the additional TI speech utterances; and
adapt the TI speaker recognition model based on the additional TI speech utterances, if the adaptation merit value exceeds a threshold.

12. The system of claim 9, wherein the training data sufficiency determination circuit is further configured to:
measure variance of phonemes of the collected TI speech utterances; and
estimate future performance of a TI speaker recognition model trained on the stored training data.

13. The system of claim 9, wherein the identity measurements comprise at least one of a result of text dependent (TD) speaker recognition, facial recognition, lip movement detection, skeletal recognition, fingerprint recognition, and biometric factor measurement.

14. The system of claim 9, wherein the speech quality analysis circuit is further configured to measure at least one of a number of frames of the TI speech utterances, a speech to noise ratio (SNR) of the TI speech utterances, noise characteristics of the TI speech utterances, and reverberation characteristics of the TI speech utterances; and the state analysis circuit is further to predict health and emotional state of the user.

15. The system of claim 9, wherein the context data includes at least one of a location of the collected TI speech utterances, a date of the collection, properties of a microphone used for the collection, SNR, noise characteristics, reverberation characteristics, and health and emotional state of the user.

16. The system of claim 9, wherein the speech utterances are represented as feature vectors.

17. At least one non-transitory computer readable storage medium having instructions encoded thereon that, when executed by one or more processors, result in the following operations for recognizing a speaker, the operations comprising:

measuring context data associated with collected TI speech utterances from a user in a context, the collected TI speech collected during a first time interval;

identifying an identity of the user based on received identity measurements;

performing a speech quality analysis of the TI speech utterances;

performing a state analysis of the user based on the TI speech utterances;

evaluating a training merit value associated with the TI speech utterances, based on the speech quality analysis and the state analysis;

storing the TI speech utterances as training data in a training database, if the training merit value exceeds a threshold value, the stored utterances indexed by the user identity and the context data;

determining a sufficiency of the stored training data for enrollment of a TI speaker recognition model;

training the TI speaker recognition model, associated with the user and the context, based on the stored training data; and employing the TI speaker recognition model to recognize the user.

18. The computer readable storage medium of claim 17, wherein the enrollment further comprises the operations of:
adding the trained TI speaker recognition model to a database of TI speaker recognition models, based on the sufficiency of the stored training data, the database indexed by the user identity and the context data; and
enabling a TI speaker recognizer for the user in the context based on the added TI speaker recognition model.

19. The computer readable storage medium of claim 17, the operations further comprising:
collecting additional TI speech utterances from the user in the context, during a second time interval;
evaluating an adaptation merit value associated with the additional TI speech utterances, the adaptation merit value based on at least one of the elapsed time between the first time interval and the second time interval, and an estimate of improvement of the TI speaker recognition model due to adaptation based on the additional TI speech utterances; and
adapting the TI speaker recognition model based on the additional TI speech utterances, if the adaptation merit value exceeds a threshold.

20. The computer readable storage medium of claim 17, wherein the determination of sufficiency further comprises the operations of:
measuring variance of phonemes of the collected TI speech utterances; and
estimating future performance of a TI speaker recognition model trained on the stored training data.

21. The computer readable storage medium of claim 17, wherein the identity measurements comprise at least one of a result of text dependent (TD) speaker recognition, facial recognition, lip movement detection, skeletal recognition, fingerprint recognition, and biometric factor measurement.

22. The computer readable storage medium of claim 17, wherein the speech quality analysis comprises the operations of measuring at least one of a number of frames of the TI speech utterances, a speech to noise ratio (SNR) of the TI speech utterances, noise characteristics of the TI speech utterances, and reverberation characteristics of the TI speech utterances; and the state analysis comprises the operations of predicting health and emotional state of the user.

23. The computer readable storage medium of claim 17, wherein the context data includes at least one of a location of the collected TI speech utterances, a date of the collection, properties of a microphone used for the collection, SNR, noise characteristics, reverberation characteristics, and health and emotional state of the user.

24. The computer readable storage medium of claim 17, wherein the speech utterances are represented as feature vectors.

* * * * *